United States Patent
Hinderthür et al.

(10) Patent No.: US 7,856,183 B2
(45) Date of Patent: Dec. 21, 2010

(54) CIRCUIT FOR TRANSMITTING SIGNALS IN A NETWORK NODE, PARTICULARLY FOR A CHANNEL CARD FOR AN OPTICAL WAVELENGTH DIVISION MULTIPLEX (WDM) SIGNAL TRASMITTING DEVICE

(75) Inventors: Henning Hinderthür, München (DE); Mario Wirsching, Suhl (DE); Hans-Jörg Schüttemeyer, Berlin (DE); Reinhard Stier, Zella-Mehlis (DE); Christian Holzbrecher, Suhl (DE)

(73) Assignee: ADVA AG Optical Networking, Meiningen (DE)

( * ) Notice: Subject to any disclaimer, the term of this patent is extended or adjusted under 35 U.S.C. 154(b) by 107 days.

(21) Appl. No.: 11/569,960

(22) PCT Filed: May 27, 2005

(86) PCT No.: PCT/DE2005/000968

§ 371 (c)(1), (2), (4) Date: Dec. 1, 2006

(87) PCT Pub. No.: WO2005/119952

PCT Pub. Date: Dec. 15, 2005

(65) Prior Publication Data

US 2008/0247755 A1    Oct. 9, 2008

(51) Int. Cl.
  *H04J 14/00* (2006.01)
  *H04L 12/50* (2006.01)
  *H04Q 11/00* (2006.01)

(52) U.S. Cl. .......................... 398/56; 370/380

(58) Field of Classification Search ............ 398/55, 398/56; 370/380
See application file for complete search history.

(56) References Cited

U.S. PATENT DOCUMENTS

| 6,281,998 | B1* | 8/2001 | Jones et al. ............. 398/9 |
| 6,335,992 | B1 | 1/2002 | Bala et al. |
| 6,744,760 | B1 | 6/2004 | Solheim |
| 2003/0193972 | A1* | 10/2003 | Pitio ................. 370/535 |
| 2004/0033079 | A1* | 2/2004 | Sheth et al. ............. 398/135 |
| 2004/0085994 | A1* | 5/2004 | Warren et al. ............ 370/462 |
| 2005/0244165 | A1* | 11/2005 | Hofmeister ............. 398/155 |

FOREIGN PATENT DOCUMENTS

EP    0437198 A    7/1991

* cited by examiner

*Primary Examiner*—Nathan M Curs
(74) *Attorney, Agent, or Firm*—The Culbertson Group, P.C.

(57) ABSTRACT

A circuit for transmitting signals in a network node, particularly for a channel card for an optical WDM signal transmission device, with a first holding device assigned to the local side of the network node, which can be freely equipped by means of a local-side transceiver unit and which has an internal transmitting port connection and an internal receiving port connection which, in case first holding device is equipped with local-side transceiver unit, are connected to the respective transmitting or receiving ports of local-side transceiver unit, with two additional holding devices assigned to the remote side of the network node having similar ports. A controllable signal switching unit is provided with novel construction to configure connections between the respective internal ports.

21 Claims, 7 Drawing Sheets

CIRCUIT FOR TRANSMITTING SIGNALS IN A NETWORK NODE, PARTICULARLY FOR A CHANNEL CARD FOR AN OPTICAL WAVELENGTH DIVISION MULTIPLEX (WDM) SIGNAL TRASMITTING DEVICE

CROSS-REFERENCE TO RELATED APPLICATION

This application is the national stage of PCT International Application No. PCT/DE2005/000968, filed May 27, 2005, entitled CIRCUIT FOR TRANSMITTING SIGNALS IN A NETWORK NODE, PARTICULARLY FOR A CHANNEL CARD FOR AN OPTICAL WAVELENGTH DIVISION MULTIPLEX (WDM) SIGNAL TRANSMITTING DEVICE, which claims the benefit of German Patent Application No. 10 2004 027 068.6 filed Jun. 3, 2004. The entire content of the PCT International Application No. PCT/DE2005/000968 is incorporated herein by this reference.

TECHNICAL FIELD OF THE INVENTION

The invention relates to a circuit for transmitting signals in a network node, particularly for a channel card for an optical WDM signal transmitting device.

BACKGROUND OF THE INVENTION

Depending on specific requirements, it is necessary in networks such as optical networks for certain component signals or channels of a WDM (wavelength-division multiplex) signal to be dropped in network nodes, i.e., supplied to local sides for further processing, and for other component signals or channels to be added to the WDM signal or looped through the node, amplified there if appropriate, and supplied to one or more additional network nodes as a WDM signal. For this purpose, the signal transmitting device of a network node is usually constructed in modular form since different circuitry components are used, depending on the concrete requirements in the network node in question.

For example, passive and active optical and/or electronic filter components, optical amplifiers and active channel modules or channel cards are used as modules in the realization of an optical network node.

Such modules, particularly channel cards, are necessary in a multitude of different designs in known signal transmitting devices, depending on the purpose for which they are used. They differ, for instance, in the properties of transceiver modules that are necessary for connecting the respective channel card to the local side of a network node, or to corresponding additional local-side signal processing devices or to corresponding additional remote-side signal processing devices of the network node or the entire additional network. The transceiver modules can be different, for example, regarding the coupling of the optical side to various optical waveguide types (single-mode fibers, multimode fibers), regarding the respective wavelength of the optical transmitting element and/or the optical receiving element that is being used, or regarding the data rate of the respective signal to be transmitted or received.

The structure of the channel cards can further differ in relation to the tasks to be undertaken by the card. For instance, it can be necessary merely to amplify and/or process the received signal and loop it through the network node, without dropping the respective channel in the network node. On the other hand, if a signal or channel is to be dropped, then a conversion of the signal from a received wavelength to another, local transmission wavelength and vice versa can be required. If the card is to realize a protection mechanism, then it is necessary to provide two transceiver units on the channel card on the remote side, wherein both transceiver modules can be controlled with the same transmission signal in the direction of the remote side of the channel card.

As already briefly indicated above, producing a corresponding channel card for each special application purpose and using it as a module in an entire signal transmitting device for the realization of a network node is already known. If the demands on the respective network node change, for instance, if different transmission wavelengths are to be used on the local side of the network node or the remote side of the network node for the respective channel or channels, then the channel card can be replaced by a different channel card.

For the user or the manufacturer of such signal transmitting devices there is therefore the disadvantage that a great number of different channel cards must be acquired or manufactured and kept in inventory. In addition to the fact that special channel cards must be developed for each application case, this leads to high costs for the individual channel cards.

SUMMARY OF THE INVENTION

The present invention, in various embodiments, provides circuits for signal transmission in a network node, particularly for a channel card for an optical WDM signal transmitting device, that is flexibly configurable and usable without an exchange of the complete circuit or channel card being necessary in each case. Furthermore, it should be possible to manufacture the invented circuit simply and cost-effectively.

The invention starts from the recognition that an invented circuit for signal transmission in a network node, particularly a channel card, can be used for a number of cases relevant in practice if the circuit or card has a first holding device assigned to the local side of the network node for a local-side transceiver unit and two additional holding devices that are assigned to the remote side of the network node and in each of which a remote-side transceiver unit can be held.

This results in the advantage that the suitable transceiver unit can be used in each of the three holding units, depending on the application purpose. The transceiver unit can be selected from a large number of ordinary transceiver units depending, for instance, on the type of optical waveguide that is coupled or is to be coupled, the transmission wavelength and the data rate of the transmission/reception signal.

Because of the possibility of freely equipping the holding devices, a channel card that is usable for a number of different application purposes can be created. To adapt to the respective concrete purpose it is only necessary to equip at least two transceiver units.

In addition to the three holding devices, the invented circuit for signal transmission has a signal switching unit that comprises six connection ports. Each connection port is connected to one of the internal receiving port connections or transmitting port connections, with the signal switching unit being controllable such that it is established for each of the internal receiving port connections whether and to which selected internal transmitting port connection or multiple connections the respective internal receiving port connection is connected.

Because of the use of a signal switching unit, the circuit or the signal card can be used for solving various problems, such as looping the received signal, dropping the received signal or simultaneously looping or dropping a received signal.

According to one embodiment of the invention, the signal switch unit can be controlled such that the internal receiving port connection of a selected remote-side holding device is connected to the transmitting port connection of the local-side holding device, and the internal transmitting port connection of the local-side holding device is connected to the transmitting port connection of the selected remote-side holding device. This corresponds to the standard case in which the channel card enables transmission and reception of a channel between the local side and the remote side of the channel card or the network node.

According to another embodiment, the signal switching unit can be controlled to realize a protection function in such a manner that the internal receiving port connection of the circuit of the local-side holding device is additionally connected to the transmitting port connection of the second, nonselected remote-side holding device.

If both remote-side holding devices are equipped with corresponding transceiver units, then the signal that is to be transmitted from the local side of the network node to the remote side of the network node is supplied to both remote-side transceiver units. If, for instance, the optical waveguide connected to one remote-side transceiver unit module is interrupted, then the signal to be transmitted is still transmitted via the additional optical waveguide that is connected to the other remote-side transceiver unit.

According to another embodiment of the invention, the signal switching unit can be controlled such that the normally open internal receiving port connection of the second, non-selected remote-side holding device is connected in protection operation to the transmitting port connection of the local-side holding device, there preferably being a switch from normal operation to protection operation if a signal can no longer be detected (loss of light) at the internal receiving port connection of the selected remote-side holding device.

It is possible in this way to switch the reception path to the receiving port connection of the nonselected holding device if a signal is no longer detectable in the operating path.

This controlling of the signal switching unit can also be done by means of an external control unit connected to the invented circuit. It goes without saying that the control circuit, including the circuit for detecting loss of light, can also be integrated into the invented circuit, in particular, the signal switching unit.

According to another embodiment of the invention, the signal switching unit can be controlled to realize a drop-and-continue function in such a manner that the internal receiving port connection of a selected remote-side holding device is connected to the transmitting port connection of the local-side holding device and simultaneously to the transmitting port connection of the non-selected remote-side holding device, each of the remote-side holding devices preferably being selectable to realize a drop-and-continue switching function.

This function can be used, for instance, for transmitting a broadcast signal such as a TV signal, which is to be supplied on the one hand to the respective network node and, on the other hand, is to be simultaneously looped through the network node for transmission to further network nodes.

According to another embodiment of the invention, the signal switching unit can be controlled to realize a regeneration and/or conversion function with respect to a remote-side signal in such a manner that the internal receiving port connection of a selected remote-side holding device is connected to the transmitting port connection of the non-selected remote-side holding device, and the internal receiving port connection of the non-selected remote-side holding device is preferably connected to the transmitting port connection of the selected remote-side holding device.

This function of the invented circuit makes possible, for instance, the conversion of the optical signal of a selected channel to a different wavelength and/or the regeneration of, and optionally the amplification of, the signal in question.

Finally, the signal switching unit can also be constructed to realize a loop function, wherein the internal receiving port connection of one, several or all holding devices is connected to the transmitting port connection of its own holding device. This function serves, for instance, for maintenance purposes of the network or the respective network node.

According to the preferred embodiment of the invention, the switching unit can consist of three four-port switching units, each with two internal ports and two external ports.

The three four-port switching units can be connected together such that a first internal port of the first four-port switching unit is connected to a first internal port of the second four-port switching unit, and a second internal port of the first four-port switching unit is connected to a first internal port of the third four-port switching unit. Additionally, a second internal port of the second four-pole switching unit is connected to a second internal port of the third four-pole switching unit. The receiving port connection of the local-side holding device is connected to a first external port of the first four-pole switching unit, and the transmitting port connection of the local-side holding device is connected to a second external port of the first four-pole switching unit. Finally, the transmitting port connections of the two remote-side holding devices are each connected to an external port of the second four-pole switching unit, and the receiving port connections of the two remote-side holding devices are each connected to an external port of the third four-pole switching unit.

The four-pole switching units can be constructed identically, particular with respect to the switching functions. In this way the number of different components for realizing the invented circuit is reduced.

Each four-pole switching unit can be controlled such that the ports can be connected in any desired manner to one another, even one port to several ports at the same time.

In this way, practically any of the internal transmitting or receiving port connections can be connected to an arbitrary other internal transmitting or receiving port connection.

According to the preferred embodiment of the invention, each of the four-pole switching units can be controlled in several selected or all of the following switching positions:

a) switching position 1: the two internal ports and/or the two external ports are connected;

b) switching position 2: the first external port is connected to the first internal port or vice versa and/or the second external port is connected to the second internal port or vice versa;

c) switching position 3: the first external port is connected to the second internal port or vice versa and/or the first internal port is connected to the second external port or vice versa d) switching position 4: either the first or the second internal port is simultaneously connected to the first and second external port;

e) switching position 5: one of the internal ports is simultaneously connected to the respective other internal port and one of the external ports.

With these switching positions of the three four-pole switching units, all the above-mentioned switching functions, and thus the most essential functions of a channel card that are relevant in practice, can be realized in a simple and cost-effective manner.

According to another embodiment of the invention, a clock signal and data processing circuit can be arranged upstream in the signal path immediately preceding the transmitting port connection of one, several or all holding devices. In this way, a very clean signal profile approximating the ideal profile results immediately preceding the transmitting port connection of the respective holding device or the transmitting port of a transceiver unit used therein.

In order to design the invented circuit to be as universally usable as possible also with respect to the parameter of the bit rate of the signal to be processed, the clock signal and data processing circuit can comprise a broadband phase-locked loop circuit that is capable of locking in within a broadband bit rate range on the clock rate of the signal supplied to it and of detecting the respective bit rate. Additionally, a control unit that compares the detected bit rate with stored values for operating bit rates for which the circuit is specified can be provided or integrated into the clock signal and data processing circuitry. If the determined bit rate deviates by more than a specified amount from all operating bit rates, then the control unit can block the respective signal path and optionally generate a corresponding error signal.

Additional embodiments of the invention can be deduced from the subordinate claims and from the detailed description and drawings.

DESCRIPTION OF PREFERRED EMBODIMENTS

Figure 1:
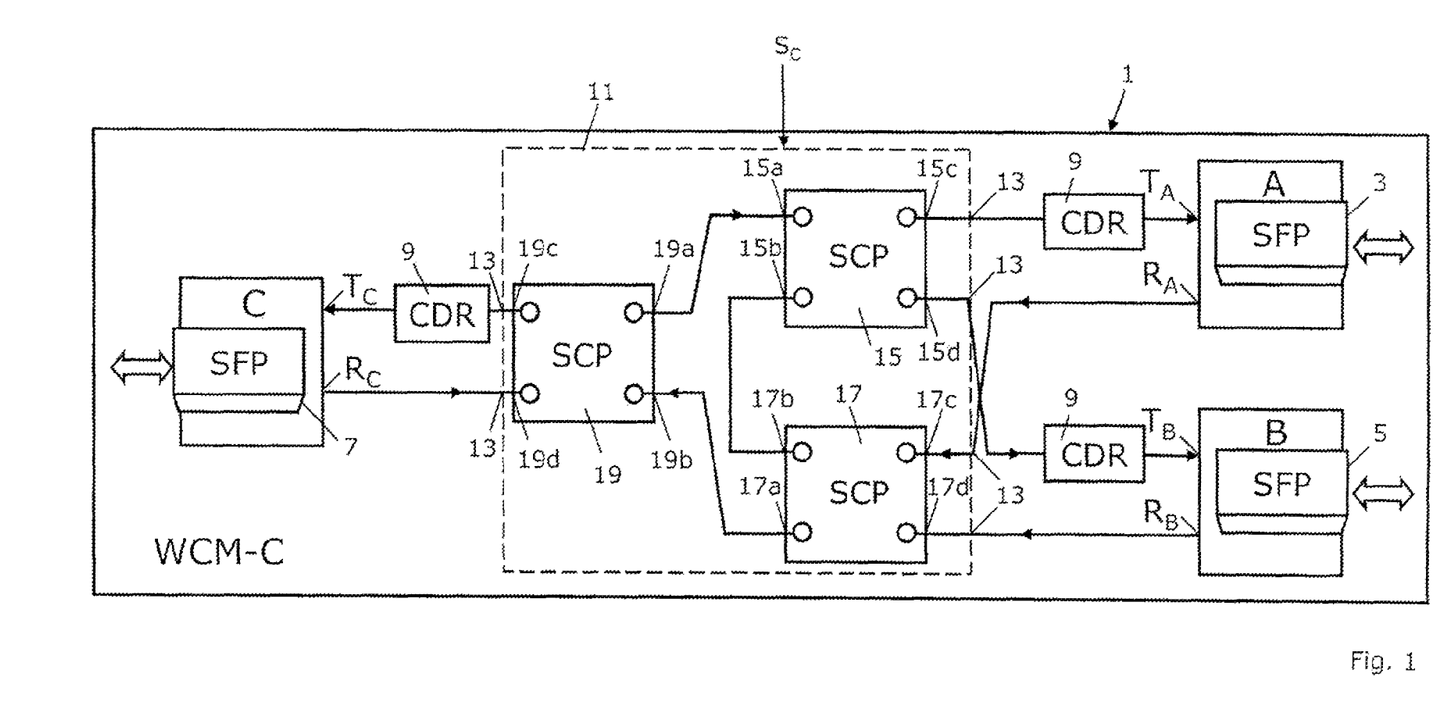
FIG. 1 is a schematic block diagram of a circuit for signal transmission in a network node for a channel card according to one embodiment.

A circuit 1 for signal transmission in a network node is schematically represented in FIG. 1. Circuit 1 comprises two remote-side holding devices A, B, which are respectively equipped with suitable transceiver units 3, 5. Holding devices A, B are preferably constructed such that remote-side transceiver units 3, 5 are interchangeably accommodated. Holding devices A, B can be constructed as a cage or a socket for receiving transceiver units 3, 5.

Circuit 1 further comprises a local-side holding device C, which can be constructed in the same manner. It serves to hold a local-side transceiver unit 7. In the realization of an optical network node, the external connections of transceiver units 3, 5 can be connected to corresponding optical waveguides. The optical waveguides can already be joined to the transceiver units in the form of pigtails, where the free ends of the pigtails can be connected via plugs or nondetachable splices to the relevant further network paths.

Holding devices A, B, C each have internal transmitting port connection $T_A$, $T_B$, $T_C$ and internal receiving port connections $R_A$, $R_B$, $R_C$ wherein, even in the realization of a network node for an optical network, the respective electrical signal to be transmitted in the direction of the remote side or the local side is supplied to transmitting port connections $T_A$, $T_B$, $T_C$. If the holding device A, B, C in question is equipped with a suitable transceiver unit 3, 5, 7, then this signal to be transmitted is naturally also supplied to the respective transmitting port of the transceiver unit 3, 5, 7 that is in use.

In the same way, the respective received signal that is received at transceiver unit 3, 5, 7 in use and is supplied by the respective receiving port of transceiver unit 3, 5, 7 to the respective receiving port connection $R_A$, $R_B$, $R_C$ of respective holding device A, B, C respectively appears at receiving port connections $R_A$, $R_B$, $R_C$ of holding devices A, B, C.

As illustrated in FIG. 1, a respective clock pulse and data processing unit 9 can be arranged in the signal path directly upstream of internal transmitting port connections $T_A$, $T_B$, $T_C$. This guarantees that a transmission signal with an optimal signal profile is present directly upstream of the respective transmitting ports of holding devices A, B, C.

Circuit 1 further comprises a signal switching unit 11 that has six connecting ports 13, each connecting port 13 being connected to one of internal transmitting port connections $T_A$, $T_B$, $T_C$ or one of internal receiving port connections $R_A$, $R_B$, $R_C$ of holding devices A, B, C.

Signal switching unit 11 is constructed such that the configuration of circuit 1 can be defined by means of a control signal $S_c$. Control signal $S_c$ can be supplied to the circuit by an external control unit (not illustrated) or generated by a control unit (likewise not illustrated) comprised by circuit 1. Control signal $S_c$ can be produced by bridges, jumpers or switches or the like.

Signal switching unit 11 can be controlled by means of control signal $S_c$ such that it can be defined for each internal receiving port connection $R_A$, $R_B$, $R_C$ whether and to which selected internal transmitting port connection $T_A$, $T_B$, $T_C$ or whether and to which several selected internal transmitting port connections $T_A$, $T_B$, $T_C$ the respective internal receiving port connection $R_A$, $R_B$, $R_C$ is connected. In this manner the configuration of the card can be adapted to the respective purpose of use.

In the embodiment of circuit 1 illustrated in FIG. 1, signal switching unit 11 is realized by means of three specially interconnected four-port switching units 15, 17, 19, which are labeled in FIG. 1 with the designation SCP for "signal cross point."

A first internal port 19a of four-port switching unit 19 is connected to a first internal port 15a of second four-port switching unit 15. A second internal port 19b of four-port switching unit 19 is connected to a first internal port 15b of four-port switching unit 17. A second internal port 15a of four-port switching unit 15 is connected to a second internal port 17b of four-port switching unit 17.

As is evident from FIG. 1, connection ports 13 of signal switching unit 11 are formed by external ports 15c, 15d, 17c, 17d, 19c, 19d of signal switching units 15, 17, 19. External port 15c of four-port switching unit 15 is connected therein (indirectly via clock signal and data processing circuit 9) to transmitting port connection $T_A$ of holding device A. In the same manner, the other external port 15d of four-port switching unit 15 is connected (indirectly via clock signal and data processing circuit 9) to transmitting port connection $T_B$ of holding device B.

Receiving port connection $R_A$ of holding device A is connected to external port 17c of four-port switching unit 17, and the receiving port connection of holding device B is connected to an additional external port 17d of four-port switching unit 17. External port 19c of four-port switching unit 19 is connected (indirectly via the concerned clock signal and data processing circuit 9) to transmitting port connection $T_C$ of holding device C, the receiving port connection $R_C$ of which is connected to external port 19d of four-port switching unit 19.

Figure 7:
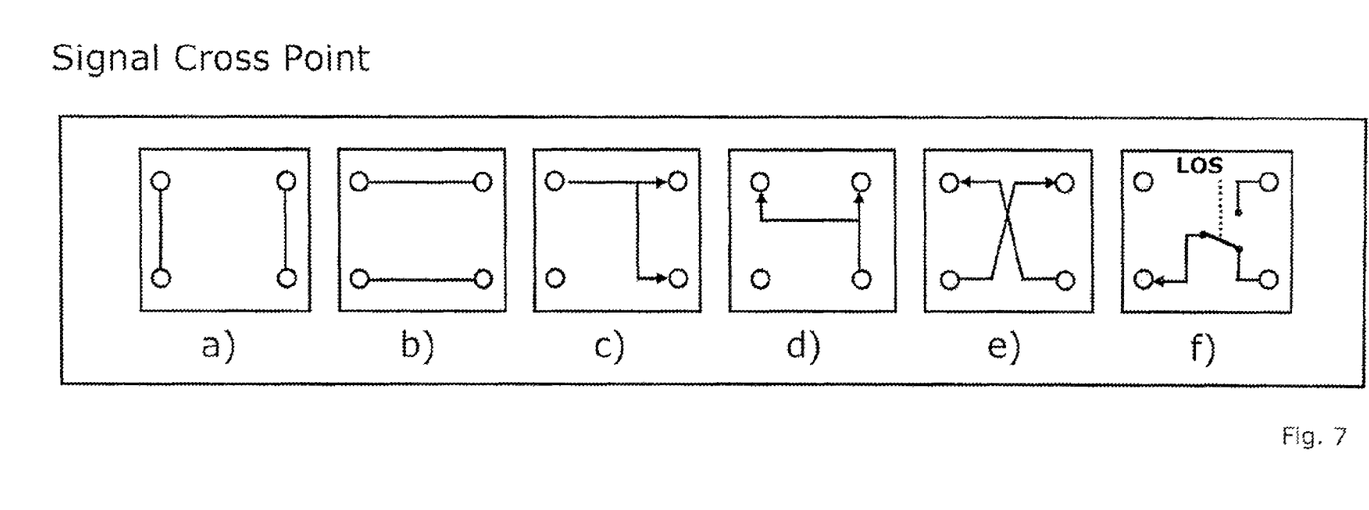
FIG. 7 shows schematic representations of possible predefined four-pole switching units in FIGS. 1-6.

The individual four-port switching units 15, 17, 19 can preferably be constructed such that they take on the switching positions shown in FIG. 7. For this purpose, control signal $S_c$ of signal switching unit 11 can naturally be supplied to each individual four-port switching unit or split into corresponding component control signals. It goes without saying that each component control signal can be produced by means of appropriate devices such as switches, jumpers, bridges or the like, each assigned to the respective four-port switching unit. For reasons of simplicity, the labels of the internal and external connecting ports for the switching positions for four-port switching units 15, 17, 19 as shown in the six individual drawings a) through f) in FIG. 7 were omitted. The switching positions are to be understood such that the left-hand connecting ports in FIGS. 7a) [through f)] each correspond to the left-hand ports of four-port switching units 15, 17, 19 in FIG. 1, and the right-hand ports of the switching positions in FIGS. 7a) through f) to the right-hand ports of four-port switching units 15, 17, 19 in FIG. 1.

Selected configurations of circuit 1 that are important in practice will be explained in detail below on the basis of the configurations illustrated in FIGS. 2 through 6.

It should first be pointed out that FIGS. 2-6 show the identical circuit illustrated and explained above in FIG. 1, with only the additionally defined switching positions of four-port switching units 15, 17, 19 being drawn in.

Figure 2:
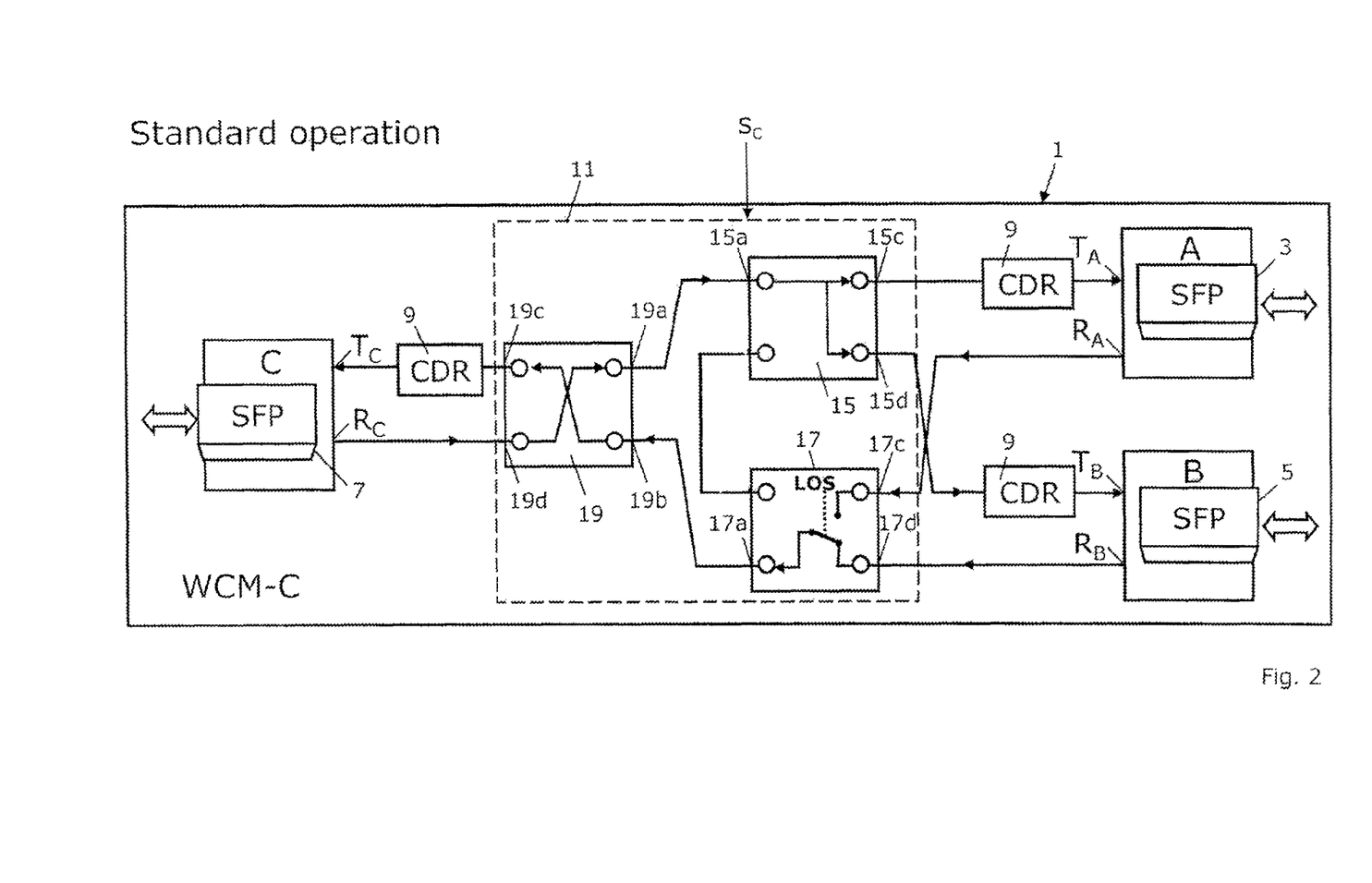
FIGS. 2-6 show schematics of the circuit according to FIG. 1 in various configurations.

FIG. 2 shows a configuration for a possible standard operation of circuit 1. In this operating mode, circuit 1 enables a bidirectional traffic relationship for a defined channel whose signal is transmitted in the normal case by means of transceiver units 3 and 7 accommodated in holding devices A and C from the local side to the remote side of circuit 1 or conversely. The transmission channel can be represented, for instance, by a channel signal of a CWDM or DWDM signal on the remote side of circuit 1.

In such an optical network, transceiver units 3, 5, 7 are naturally constructed as optoelectrical or electrooptical converters.

In the configuration illustrated in FIG. 2, the optical channel signal supplied to transceiver unit 3 is optoelectrically converted and is then present at receiving port connection $R_A$ of holding device A.

According to the switching position of four-port switching unit 17 as illustrated in FIG. 2, the received signal, which is supplied to port 17c of four-port switching unit 17, is supplied via port 17a to port 19b of four-port switching unit 19. Four-port switching unit 19 has the crossed switching position illustrated in FIG. 2, so that the received signal is supplied via port 19c and clock signal and data processing circuit 9 to transmitting port connection $T_C$ of holding device C. The received signal is then electrooptically converted by transceiver unit 7 and emitted as the received signal to the local side of circuit 1. The optical wavelength of the signal emitted to the local side can differ here from the wavelength of the remote-side received optical channel signal. A different type of optical waveguide from that on the remote side can likewise be used.

A signal to be transmitted from the local side to the remote side of circuit 1 is first optoelectrically converted by transceiver unit 7 and supplied via receiving port connection $R_C$ to port 19d of four-port switching unit 19. As a result of the crossed switching position of four-port switching unit 19, the received signal is supplied via port 19a to port 15a of four-port switching unit 15. Because of the splitting switching position of four-port switching unit 15, this signal is supplied on the one hand via port 15c and clock signal and data processing circuit 9 to transmitting port connection $T_A$ of holding device A and, on the other hand, to transmitting port connection $T_B$ of holding device B via port 15d and respective clock signal and data processing circuit 9. Transceiver units 3 and 5 convert this signal electrooptically and supply it to the respective remote side, for instance, a separate optical waveguide on each remote side. The wavelengths of these optical transmission signals can be identical or different.

In this case, the signal path via transceiver unit 5 serves as a protection path so that, in case of a failure of the transmission path connected to transceiver unit 3, the respective receiving network nodes receive the same signal via the protection path to which transceiver unit 5 is connected.

Four-port switching unit 17 is constructed in this case such that it has a switch that holds the switching position illustrated in FIG. 2 in normal operation. If "loss of signal" is detected for the signal supplied to four-port switching unit 17 via port 17c, which is the case, for example, if the transmission path that is connected to transceiver unit 3 is interrupted, then the switch realized in four-port switching unit 17 is placed in the other switching position. In this switching position, four-port switching unit 17 connects ports 17d and 17a, so that the protection signal present of receiving port connection $R_B$ of holding device B is transmitted in the above-described manner to the local side of circuit 1. The traffic relationship is maintained in this case via transceiver unit 5. The detecting of "loss of signal" can be done by four-port switching unit 17 or by additional devices that emit a corresponding signal to four-port switching unit 17.

It goes without saying that it is possible to do without transceiver unit 5 in the embodiment illustrated in FIG. 2 if no protection mechanism is necessary. In this case, only a channel signal between transceiver units 3 and 7 is transmitted. The four-port switching units in this case can in principle realize the same switching positions or functions. It is also possible, however, to control four-port switching unit 15 such that it connects only ports 15a and 15b, in which case the splitting function is forgone. Four port switching unit 17 can be controlled in a simplified manner such that only ports 17c and 17a are connected. A switching function is not possible in this simplified case.

Figure 3:
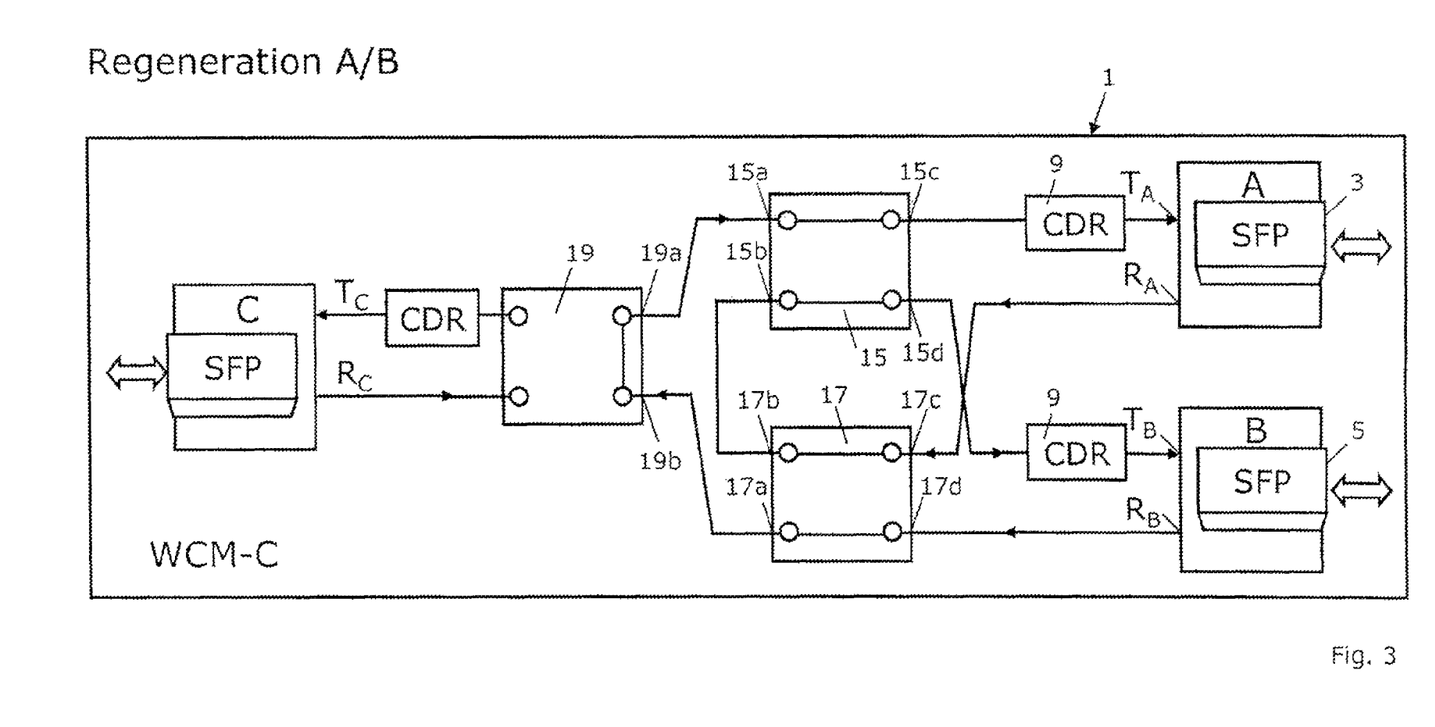

In the configuration of circuit 1 illustrated in FIG. 3, only a regeneration and/or wavelength conversion of the respectively supplied optical signal is performed. The optical signal supplied to transceiver unit 3 is optoelectrically converted and supplied via receiving port connection $R_A$ to port 17c of four-port switching unit 17. The latter is controlled such that [port] 17c is connected to port 17b, so that the signal is supplied to port 15b of four-port switching unit 15. Since four-port switching unit 15 is controlled such that port 15b is connected to port 15d, the signal is supplied via clock signal and data processing circuit 9 to transmitting port connection $T_B$ of holding device B, electrooptically converted by transceiver unit 5 and again supplied to the remote side. When transceiver units 3, 5 with different wavelengths are used, a wavelength conversion of the signal can therefore be achieved in this signal path. A signal regeneration can also be performed by means of clock signal and data processing circuit 9. If the wavelengths of transceiver units 3 and 5 do not differ, then only a signal regeneration is performed.

In the opposite direction, the respective optical signal is supplied to transceiver unit 5 and optoelectrically converted. Via receiving port connection $R_B$ of holding device B, the signal reaches port 17d of four-port switching unit 17. The latter port is connected to port 17a in the switching position shown in FIG. 3. Via port 17a the signal thus reaches port 19b of four-port switching unit 19, which is controlled such that port 19b is connected to port 19a. The signal thus reaches port 15a of four-port switching unit 15 via port 19a. The latter four-port switching unit is controlled such that port 15a is connected to port 15c. The signal thus reaches transmitting port connection $T_A$ of holding device A from port 15c via clock signal and data processing circuit 9. The signal is electrooptically converted by transceiver unit 3 and supplied to the remote side of circuit 1. In this signal path as well, there can thus be a signal regeneration or a wavelength conversion. Since no local-side transceiver unit is necessary in a pure regeneration and/or wavelength conversion of the remote-side signal, holding device C can remain unpopulated in the configuration illustrated in FIG. 3.

Figure 4:
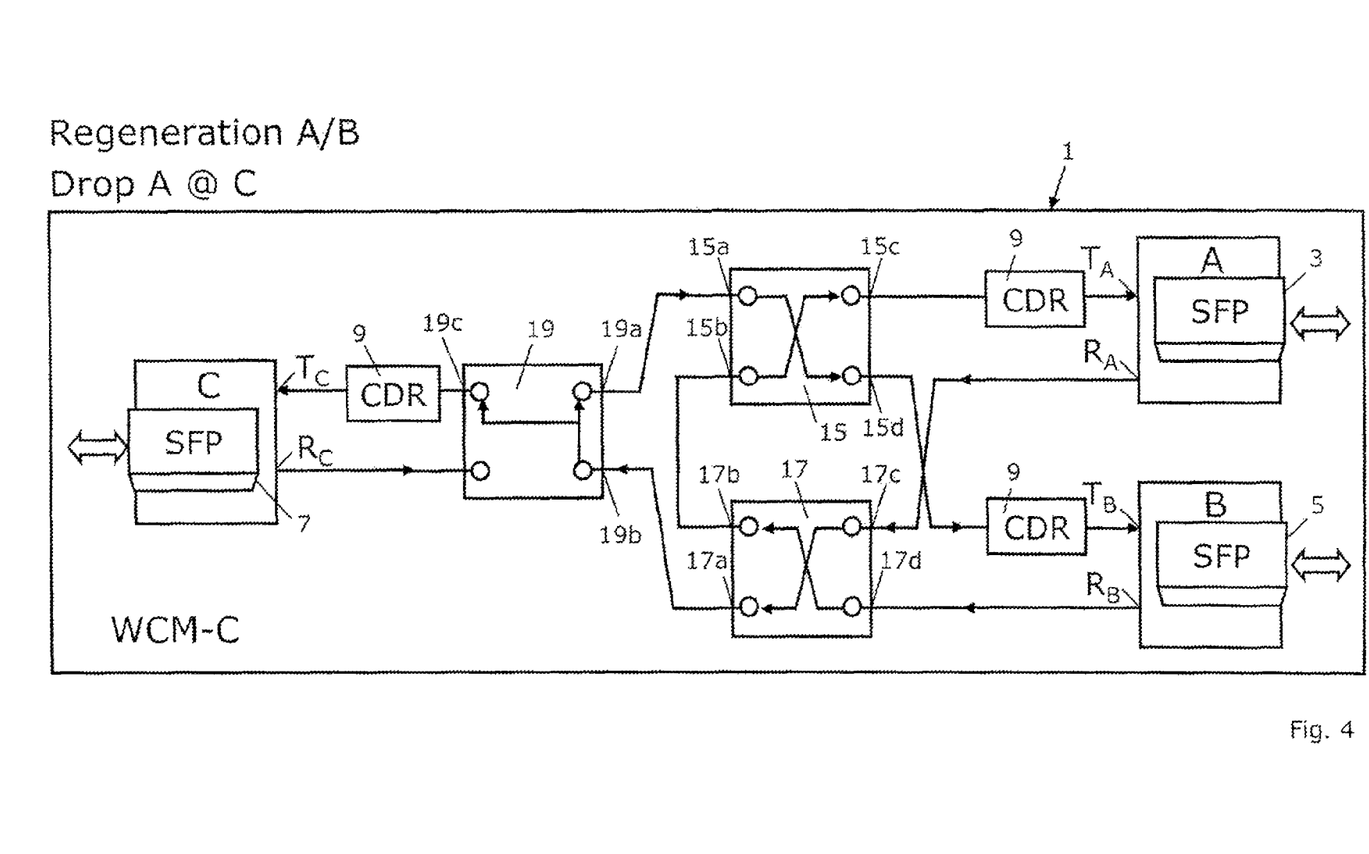

The configuration of circuit 1 illustrated in FIG. 4 is identical to the configuration of FIG. 3 with respect to the switching positions or controlling of four-port switching units 15 and 17. A signal regeneration and/or a wavelength conversion can also be performed in the configuration according to FIG. 4. To that extent we refer to the discussions regarding FIG. 3.

Differently from FIG. 3, four-port switching unit 19 with the configuration according to FIG. 4 is additionally controlled or interconnected such that a split function regarding the signal received by transceiver unit 3 is also possible. For this purpose, port 19c of four-port switching unit 19 is additionally connected to ports 19a, 19b. Via port 19c and clock signal and data processing circuit 9, the received signal thus reaches transmitting port connection $T_C$ of holding device C. Transceiver unit 7 accommodated therein converts this signal electrooptically and supplies this signal to the local side of circuit 1.

Transceiver unit 7 can also be constructed only as a transmitter unit since, in order to realize the configuration illustrated in FIG. 4, it need not be capable of receiving a signal from the local side and of transmitting it to the remote side of circuit 1.

Figure 5:
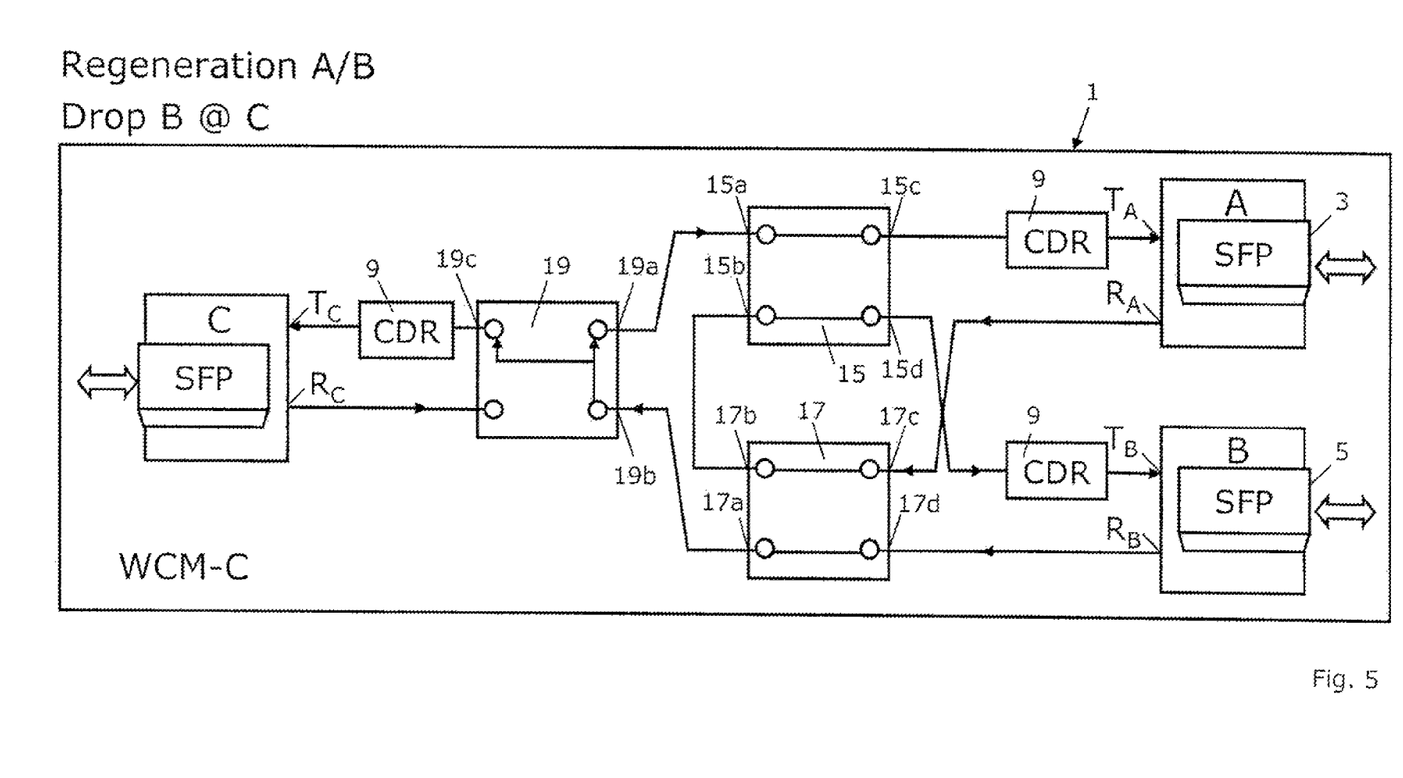

The configuration illustrated in FIG. 5 differs from the configuration illustrated in FIG. 4 in that four-port switching units 15 and 17 are not in a crossed switching position, but are instead controlled to be in a looped through switching position, in which ports 15a and 15c, 15b and 15d, 17b and 17c, 17a and 17d are connected. Thereby, differing from the configuration according to FIG. 4, it is not the signal received by transceiver unit 3 that is transmitted to the local side of circuit 1, but rather the signal received by transceiver unit 5. Otherwise, the above explanations in connection with the configuration according to FIG. 4 apply to these circuits.

The embodiments according to FIGS. 4 and 5 make possible, for instance, the transmission of a broadcast signal such as a television signal in a network, wherein the signal is not only dropped in the respective network node, but is also looped through to the next network node. At the same time, there can be a signal regeneration.

Figure 6:
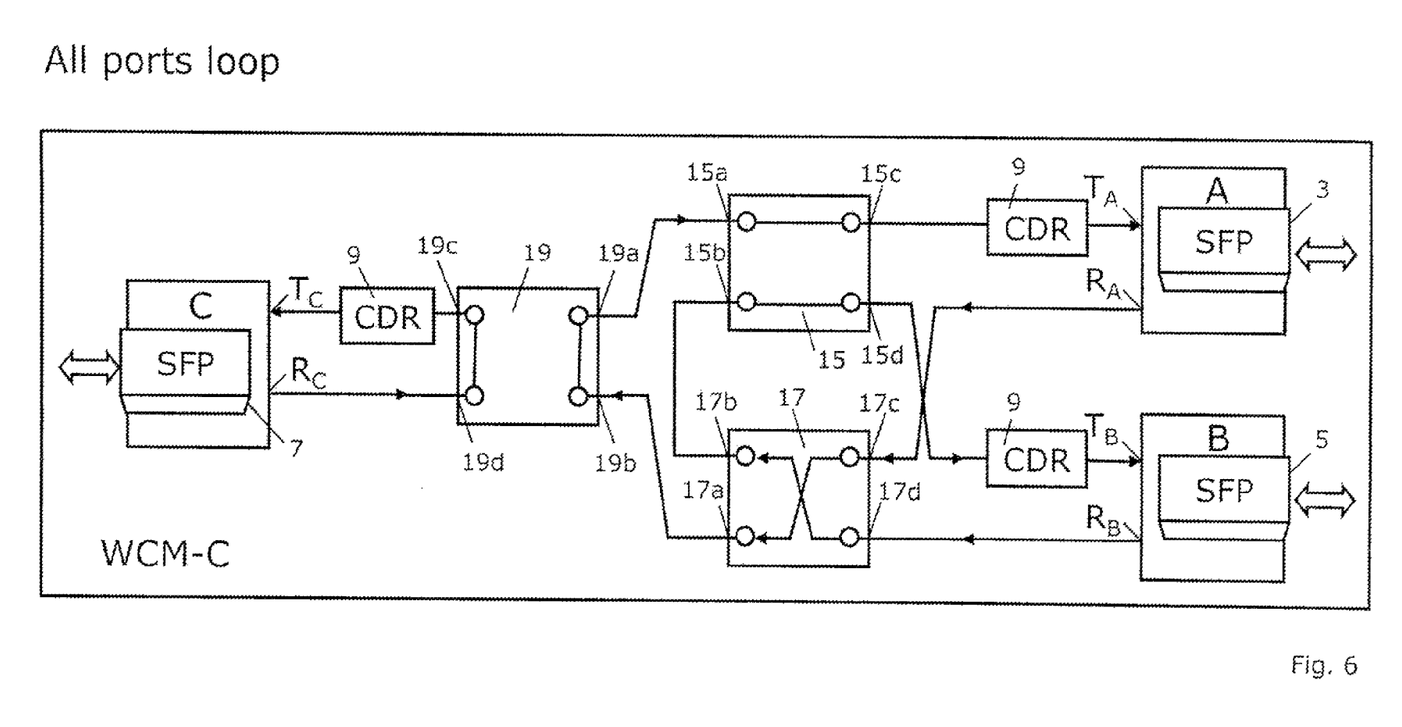

The configuration illustrated in FIG. 6 is normally used only for maintenance purposes. Since four-port switching units 15, 17, 19 are controlled such that, respectively, ports 15a and 15c, 15b and 15d, 17b and 17d, 17a and 17c, 19a and 19b, and 19c and 19d are connected, and every receiving port connection $R_A$, $R_B$, $R_C$ is connected to the associated transmitting port connection $T_A$, $T_B$, $T_C$, so that the signal from the respective transceiver unit 3, 5, 7 is looped back to itself. This configuration allows, for instance, the testing of the associated transmission path from a distant point. Naturally, however, this configuration can only be used in those cases when a received signal present at a transceiver unit is to be merely regenerated and transmitted back in the same direction.

Alongside the configurations illustrated in FIGS. 2-6, additional, different configurations of four-port switching units 15, 17, 19 also make possible more advanced configurations. Circuit 1 need only be controlled such that four-port switching units 15, 17, 19 have the desired switching positions. In extreme cases the configuration can even be modified during operation of circuit 1.

Providing holding devices A, B, C results in the advantage that circuit 1 or the respective channel card can be freely equipped with those transceiver units 3, 5, 7 that are required for the respective purpose of use. It goes without saying that only those holding devices A, B, C that are necessary for the respective configuration need be equipped with a corresponding transceiver unit 3, 5, 7.

The invention claimed is:

1. A channel card for an optical WDM signal transmission device for use in a network node having a local side and a remote side, the channel card comprising:
   a) a first holding device assigned to the local side of the network node, the first holding device adapted to be equipped with a local-side transceiver unit, and having an internal transmitting port connection and an internal receiving port connection which are adapted to connect to the respective transmitting or receiving ports of the local-side transceiver unit;
   b) two additional holding devices, which are both adapted to be equipped with a respective remote-side transceiver unit, and which each have an internal transmitting port connection and an internal receiving port connection, which are adapted to connect to respective ports of the remote-side transceiver units;
   c) a signal switching unit that has six connecting ports, wherein each connecting port is respectively connected to one of the internal transmitting port connections or receiving port connections of the first holding device or of the two additional holding devices;
   d) wherein the signal switching unit consists of three four-port switching units, each with two internal ports for connecting the four-port switching units among one another, and each with two external ports realizing the six connecting ports;
   e) wherein the signal switching unit physical design and control circuitry are constructed to allow control such that it is defined for each of the internal receiving port connections whether and to which selected internal transmitting port connection, or multiple selected internal transmitting port connections, the respective internal receiving port connection is connected;
   f) wherein the signal switching unit physical design and control circuitry are constructed to allow control such that the internal receiving port connection of a selected remote-side holding device is connected to the transmitting port connection of local-side holding device, and the internal receiving port connection of local-side holding device is connected to the transmitting port connection of the selected remote-side holding device;
   g) wherein the signal switching unit physical design and control circuitry are constructed in such a manner to realize a protection function in that the internal receiving port connection of local-side holding device is connected to the transmitting port connection of a second, nonselected remote-side holding device;
   h) wherein the signal switching unit is adapted to be controlled such that the normally open internal receiving port connection of the second, nonselected remote-side holding device is connected in protection operation to transmitting port connection of local-side holding device, in such a manner as to cause a switch from normal operation to protection operation if a signal can no longer be detected at the internal receiving port connection of the selected remote-side holding device.

2. A channel card for an optical WDM signal transmission device for use in a network node having a local side and a remote side, the channel card comprising:

a) a first holding device assigned to the local side of the network node, the first holding device adapted to be equipped with a local-side transceiver unit, and having an internal transmitting port connection and an internal receiving port connection which are adapted to connect to the respective transmitting or receiving ports of the local-side transceiver unit;

b) two additional holding devices, which are both adapted to be equipped with a respective remote-side transceiver unit, and which each have an internal transmitting port connection and an internal receiving port connection, which are adapted to connect to respective ports of the remote-side transceiver units;

c) a signal switching unit that has six connecting ports, wherein each connecting port is respectively connected to one of the internal transmitting port connections or receiving port connections of the first holding device or of the two additional holding devices;

d) wherein the signal switching unit consists of three four-port switching units, each with two internal ports for connecting the four-port switching units among one another, and each with two external ports realizing the six connecting ports;

e) wherein the signal switching unit physical design and control circuitry are constructed to allow control such that it is defined for each of the internal receiving port connections whether and to which selected internal transmitting port connection, or multiple selected internal transmitting port connections, the respective internal receiving port connection is connected; and f) wherein the signal switching unit physical design and control circuitry are constructed to realize a drop-and-continue function in such a manner that the internal receiving port connection of a selected remote-side holding device is connected to the transmitting port connection of the local-side holding device and simultaneously to the transmitting port connection of a non-selected remote-side holding device, each of the remote-side holding devices being selectable to realize a drop-and-continue switching function.

3. The channel card of claim 2, wherein the signal switching unit physical design and control circuitry are constructed to allow control such that the internal receiving port connection of a selected remote-side holding device is connected to transmitting port connection of local-side holding device, and internal receiving port connection of local-side holding device is connected to transmitting port connection of the selected remote-side holding device.

4. The channel card of claim 2, wherein the signal switching unit physical design and control circuitry are constructed in such a manner to realize a protection function in that the internal receiving port connection of local-side holding device is connected to transmitting port connection of a second, nonselected remote-side holding device.

5. A channel card for an optical WDM signal transmission device for use in a network node having a local side and a remote side, the channel card comprising:

a) a first holding device assigned to the local side of the network node, the first holding device adapted to be equipped with a local-side transceiver unit, and having an internal transmitting port connection and an internal receiving port connection which are adapted to connect to the respective transmitting or receiving ports of the local-side transceiver unit;

b) two additional holding devices, which are both adapted to be equipped with a respective remote-side transceiver unit, and which each have an internal transmitting port connection and an internal receiving port connection, which are adapted to connect to respective ports of the remote-side transceiver units;

c) a signal switching unit that has six connecting ports, wherein each connecting port is respectively connected to one of the internal transmitting port connections or receiving port connections of the first holding device or of the two additional holding devices;

d) wherein the signal switching unit consists of three four-port switching units, each with two internal ports for connecting the four-port switching units among one another, and each with two external ports realizing the six connecting ports;

e) wherein the signal switching unit has a physical design and control circuitry constructed to allow control such that it is defined for each of the internal receiving port connections whether and to which selected internal transmitting port connection, or multiple selected internal transmitting port connections, the respective internal receiving port connection is connected; and f) wherein the signal switching unit physical design and control circuitry are constructed to realize a regeneration and/or conversion function with respect to a remote-side signal in such a manner that the internal receiving port connection of a selected remote-side holding device is connected to transmitting port connection of a non-selected remote-side holding device.

6. The channel card of claim 5, wherein the signal switching unit physical design and control circuitry are constructed to realize a loop function in such a manner that the internal receiving port connection of one, several or all holding devices is connected to the transmitting port connection of the same respective holding device.

7. The channel card of claim 5, wherein a selected first internal port of a first one of the three four-port switching units is connected to a selected first internal port of a second one of the four-port switching units, and a selected second internal port of the first four-port switching unit is connected to a selected first internal port of a third one of the four-port switching units, and wherein a second internal port of the second four-port switching unit is connected to a selected second internal port of the third four-port switching unit, and wherein the receiving port connection of the first holding device is connected to a selected first external port of the first four-port switching unit, and the transmitting port connection of the first holding device is connected directly or indirectly to a selected second external port of the first four-port switching unit, and wherein the transmitting port connections of the two additional holding devices are each connected directly or indirectly to a selected external port of the second four-port switching unit, and the receiving port connections of the two additional holding devices are each connected to a selected external port of the third four-port switching unit.

8. The channel card of claim 5, wherein the four-port switching units are constructed identically.

9. The channel card of claim 5, wherein the internal receiving port connection of the non-selected remote-side holding device is connected to the transmitting port connection of the selected remote-side holding device.

10. The channel card of claim 7, further including a means for controlling one of the four-port switching units so that its ports can be connected to one another, including connections with one port to more than one other ports at the same time so as to define for each of the internal receiving port connections whether and to which selected internal transmitting port connection, or multiple selected internal transmitting port connections, the respective internal receiving port connection is connected.

11. The channel card of claim 5, wherein the signal switching unit physical design and control circuitry are constructed to allow control such that the internal receiving port connection of a selected remote-side holding device is connected to transmitting port connection of local-side holding device, and internal receiving port connection of local-side holding device is connected to transmitting port connection of the selected remote-side holding device.

12. The channel card of claim 5, wherein the signal switching unit physical design and control circuitry are constructed in such a manner to realize a protection function in that the internal receiving port connection of local-side holding device is connected to transmitting port connection of a second, nonselected remote-side holding device.

13. The channel card of claim 5, wherein each four-port switching unit physical design and control circuitry are constructed to allow control in three or more of the following switching positions, with switching position 1 always being one of the three:
   a) switching position 1: the two internal ports and/or the two external ports are connected;
   b) switching position 2: the first external port is connected to the first internal port or vice versa and/or the second external port is connected to the second internal port or vice versa:
   c) switching position 3: the first external port is connected to the second internal port or vice versa and/or the first internal port is connected to the second external port or vice versa;
   d) switching position 4: either the first or the second internal port is simultaneously connected to the first and the second external port; and
   e) switching position 5: one of the internal ports is simultaneously connected to the respective other internal port and one of the external ports.

14. A channel card for an optical WDM signal transmission device for use in a network node having a local side and a remote side, the channel card comprising:
   a) a first holding device assigned to the local side of the network node, the first holding device adapted to be equipped with a local-side transceiver unit, and having an internal transmitting port connection and an internal receiving port connection which are adapted to connect to the respective transmitting or receiving ports of the local-side transceiver unit;
   b) two additional holding devices, which are both adapted to be equipped with a respective remote-side transceiver unit, and which each have an internal transmitting port connection and an internal receiving port connection, which are adapted to connect to respective ports of the remote-side transceiver units;
   c) a signal switching unit that has six connecting ports, wherein each connecting port is respectively connected to one of the internal transmitting port connections or receiving port connections of the first holding device or of the two additional holding devices;
   d) wherein the signal switching unit consists of three four-port switching units, each with two internal ports for connecting the four-port switching units among one another, and each with two external ports realizing the six connecting ports;
   e) wherein the signal switching unit has a physical design and control circuitry constructed to allow control such that it is defined for each of the internal receiving port connections whether and to which selected internal transmitting port connection, or multiple selected internal transmitting port connections, the respective internal receiving port connection is connected;
   f) wherein a selected first internal port of a first one of the three four-port switching units is connected to a selected first internal port of a second one of the four-port switching units, and a selected second internal port of the first four-port switching unit is connected to a selected first internal port of a third one of the four-port switching units, and wherein a second internal port of the second four-port switching unit is connected to a selected second internal port of the third four-port switching unit, and wherein the receiving port connection of the first holding device is connected to a selected first external port of the first four-port switching unit, and the transmitting port connection of the first holding device is connected directly or indirectly to a selected second external port of the first four-port switching unit, and wherein the transmitting port connections of the two additional holding devices are each connected directly or indirectly to a selected external port of the second four-port switching unit, and the receiving port connections of the two additional holding devices are each connected to a selected external port of the third four-port switching unit; and
   g) wherein each of the four-port switching unit has a physical design and control circuitry constructed such that its ports can be connected to one another, including connections with one port to several ports at the same time so as to define for each of the internal receiving port connections whether and to which selected internal transmitting port connection, or multiple selected internal transmitting port connections, the respective internal receiving port connection is connected.

15. The channel card of claim 14, wherein each four-port switching unit physical design and control circuitry are constructed to allow control in three or more of the following switching positions:
   a) switching position 1: the two internal ports and/or the two external ports are connected;
   b) switching position 2: the first external port is connected to the first internal port or vice versa and/or the second external port is connected to the second internal port or vice versa;
   c) switching position 3: the first external port is connected to the second internal port or vice versa and/or the first internal port is connected to the second external port or vice versa;
   d) switching position 4: either the first or the second internal port is simultaneously connected to the first and the second external port; and
   e) switching position 5: one of the internal ports is simultaneously connected to the respective other internal port and one of the external ports.

16. The channel card of claim 14, wherein at least two of holding devices are equipped with transceivers suitable to an intended purpose of use for the circuit.

17. The channel card of claim 14, further comprising at least one clock signal and a data processing circuit arranged in a signal path immediately preceding transmitting port connection of a respective at least one of the holding devices.

18. The channel card of claim 17, wherein the clock signal and data processing circuit comprises a broadband phase-locked loop circuit that is capable of locking in within a broadband bit rate range on a clock rate of the signal supplied to it and of detecting the respective bit rate, and wherein a control unit is provided, the control unit capable of comparing the detected bit rate with stored values for operating bit rates for which the circuit is specified, and wherein the control unit is adapted to cause the signal path to be blocked if the determined bit rate deviates by more than a specified amount from all operating hit rates.

19. A circuit for transmitting signals in a network node having a local side and a remote side, particularly for a channel card for an optical WDM signal transmission device, the circuit comprising:
   a) a first holding device assigned to the local side of the network node, the first holding device adapted to be equipped with a local-side transceiver unit, and having an internal transmitting port connection and an internal receiving port connection which are adapted to connect to the respective transmitting or receiving ports of the local-side transceiver unit;
   b) two additional holding devices, which are both adapted to be equipped with a respective remote-side transceiver unit, and which each have an internal transmitting port connection and an internal receiving port connection, which are adapted to connect to respective ports of the remote-side transceiver units;
   c) a signal switching unit that has six connecting ports, wherein each connecting port is respectively connected to one of the internal transmitting port connections or receiving port connections of the first holding device or of the two additional holding devices;
   d) wherein the signal switching unit consists of three four-port switching units, each with two internal ports for connecting the four-port switching units among one another, and each with two external ports realizing the six connecting ports; and
   e) wherein the signal switching unit is adapted to be controlled such that it is defined for each of the internal receiving port connections whether and to which selected internal transmitting port connection, or multiple selected internal transmitting port connections, the respective internal receiving port connection is connected;
   f) wherein the signal switching unit is adapted to be controlled such that internal receiving port connection of a selected remote-side holding device is connected to transmitting port connection of local-side holding device, and internal receiving port connection of local-side holding device is connected to transmitting port connection of the selected remote-side holding device;
   g) wherein the signal switching unit is adapted to be controlled in such a manner to realize a protection function in that the internal receiving port connection of local-side holding device is connected to transmitting port connection of a second, nonselected remote-side holding device; and
   h) wherein the signal switching unit is adapted to be controlled such that the normally open internal receiving port connection of the second, nonselected remote-side holding device is connected in protection operation to transmitting port connection of local-side holding device, in such a manner as to cause a switch from normal operation to protection operation if a signal can no longer be detected at the internal receiving port connection of the selected remote-side holding device.

20. A circuit for transmitting signals in a network node having a local side and a remote side, particularly for a channel card for an optical WDM signal transmission device, the circuit comprising:
   a) a first holding device assigned to the local side of the network node, the first holding device adapted to be equipped with a local-side transceiver unit, and having an internal transmitting port connection and an internal receiving port connection which are adapted to connect to the respective transmitting or receiving ports of the local-side transceiver unit;
   b) two additional holding devices, which are both adapted to be equipped with a respective remote-side transceiver unit, and which each have an internal transmitting port connection and an internal receiving port connection, which are adapted to connect to respective ports of the remote-side transceiver units;
   c) a signal switching unit that has six connecting ports, wherein each connecting port is respectively connected to one of the internal transmitting port connections or receiving port connections of the first holding device or of the two additional holding devices;
   d) wherein the signal switching unit consists of three four-port switching units, each with two internal ports for connecting the four-port switching units among one another, and each with two external ports realizing the six connecting ports; and
   e) wherein the signal switching unit is adapted to be controlled such that it is defined for each of the internal receiving port connections whether and to which selected internal transmitting port connection, or multiple selected internal transmitting port connections, the respective internal receiving port connection is connected; and
   f) wherein the signal switching unit is adapted to be controlled to realize a drop-and-continue function in such a manner that the internal receiving port connection of a selected remote-side holding device is connected to the transmitting port connection of the local-side holding device and simultaneously to the transmitting port connection of a non-selected remote-side holding device, each of the remote-side holding devices being selectable to realize a drop-and-continue switching function.

21. A circuit for transmitting signals in a network node having a local side and a remote side, particularly for a channel card for an optical WDM signal transmission device, the circuit comprising:
   a) a first holding device assigned to the local side of the network node, the first holding device adapted to be equipped with a local-side transceiver unit, and having an internal transmitting port connection and an internal receiving port connection which are adapted to connect to the respective transmitting or receiving ports of the local-side transceiver unit;
   b) two additional holding devices, which are both adapted to be equipped with a respective remote-side transceiver unit, and which each have an internal transmitting port connection and an internal receiving port connection, which are adapted to connect to respective ports of the remote-side transceiver units;
   c) a signal switching unit that has six connecting ports, wherein each connecting port is respectively connected to one of the internal transmitting port connections or receiving port connections of the first holding device or of the two additional holding devices;
   d) wherein the signal switching unit consists of three four-port switching units, each with two internal ports for connecting the four-port switching units among one another, and each with two external ports realizing the six connecting ports; and e) wherein the signal switching unit is adapted to be controlled such that it is defined for each of the internal receiving port connections whether and to which selected internal transmitting port connection, or multiple selected internal transmitting port connections, the respective internal receiving port connection is connected;
f) at least one clock signal and a data processing circuit arranged in a signal path immediately preceding transmitting port connection of a respective at least one of the holding devices;
g) wherein the clock signal and data processing circuit comprises a broadband phase-locked loop circuit that is capable of locking in within a broadband bit rate range on a clock rate of the signal supplied to it and of detecting the respective bit rate, and wherein a control unit is provided, the control unit capable of comparing the detected bit rate with stored values for operating bit rates for which the circuit is specified, and wherein the control unit is adapted to cause the signal path to be blocked if the determined bit rate deviates by more than a specified amount from all operating bit rates.

* * * * *

UNITED STATES PATENT AND TRADEMARK OFFICE
CERTIFICATE OF CORRECTION

| | | |
|---|---|---|
| PATENT NO. | : 7,856,183 B2 | Page 1 of 1 |
| APPLICATION NO. | : 11/569960 | |
| DATED | : December 21, 2010 | |
| INVENTOR(S) | : Henning Hinderthur | |

It is certified that error appears in the above-identified patent and that said Letters Patent is hereby corrected as shown below:

At column 15, line 6: change "operating hit" to read --operating bit--.

Signed and Sealed this
Twenty-second Day of March, 2011

David J. Kappos
*Director of the United States Patent and Trademark Office*